United States Patent [19]

Bissot et al.

[11] Patent Number: 4,490,484

[45] Date of Patent: Dec. 25, 1984

[54] MEMBRANE ASSEMBLY, ELECTROCHEMICAL CELL, AND ELECTROLYSIS PROCESS USING PERFLUORINATED SANDWICH TYPE MEMBRANE

[75] Inventors: Thomas C. Bissot, Newark; William E. Grigsby, Wilmington, both of Del.

[73] Assignee: E. I. Du Pont de Nemours and Company, Wilmington, Del.

[21] Appl. No.: 313,589

[22] Filed: Oct. 21, 1981

[51] Int. Cl.$^3$ .......................... B01J 47/12; B32B 7/00
[52] U.S. Cl. ..................................... 521/27; 204/296; 204/252; 418/422
[58] Field of Search .................. 521/27; 204/296, 252; 428/422

[56] References Cited

U.S. PATENT DOCUMENTS

| | | | |
|---|---|---|---|
| 2,730,768 | 1/1956 | Clarke | 521/27 |
| 3,976,549 | 8/1976 | Flavo | 204/1 R |
| 4,151,053 | 4/1979 | Seko et al. | 204/98 |
| 4,165,248 | 8/1979 | Darlington et al. | 428/422 |
| 4,178,218 | 12/1979 | Seko | 204/98 |
| 4,253,900 | 3/1981 | Dege et al. | 521/27 |
| 4,331,521 | 5/1982 | Chisholm et al. | 204/283 |

FOREIGN PATENT DOCUMENTS

| | | |
|---|---|---|
| 76478 | 10/1970 | German Democratic Rep. . |
| 93990 | 11/1972 | German Democratic Rep. . |
| 52-36589 | 3/1977 | Japan . |
| 52-120999 | 10/1977 | Japan . |
| 55-50480 | 4/1980 | Japan . |
| 1273164 | 5/1972 | United Kingdom . |

Primary Examiner—Joseph L. Schofer
Assistant Examiner—Peter F. Kulkosky

[57] ABSTRACT

A membrane assembly which comprises a layer of perfluorinated polymer which has carboxylate functional groups, a layer of perfluorinated polymer which has ion exchange functional groups, and a water-containing or water-soluble stratum which lies between these two layers and joins them together, is described. Such a multilayered composite membrane is more simply made than conventional multilayered membranes having adherent layers, and provides for easy recovery of the component parts thereof. The membrane assembly is useful for separating the compartments of an electrochemical cell, especially a chloralkali cell.

13 Claims, No Drawings

MEMBRANE ASSEMBLY, ELECTROCHEMICAL CELL, AND ELECTROLYSIS PROCESS USING PERFLUORINATED SANDWICH TYPE MEMBRANE

BACKGROUND OF THE INVENTION

Fluorinated ion exchange polymers having carboxylic acid and/or sulfonic acid functional groups or salts thereof are known in the art. One principal use of such polymers is as a component of a membrane used to separate the anode and cathode compartments of a chloralkali electrolysis cell. Such membrane can be in the form of a reinforced or unreinforced film or laminar structure.

Experience over recent years has shown that electrochemical cells, especially chloralkali cells, exhibit best performance when the membrane employed in such cells is one having a multilayered structure wherein the layers are of diverse composition and serve different functions. For example, for a chloralkali cell, a membrane having a layer of a sulfonate polymer, which has a low electrical resistance but poorly rejects passage of hydroxyl ions, and a layer of a carboxylate polymer, which has a higher electrical resistance but rejects hydroxyl ions more efficiently, provides better cell performance than a membrane of sulfonate polymer only or carboxylate polymer only. Such structures may have two, three, or even more layers.

However, preparation of such multilayered membranes is a complex art, in which such structures are built up by thermal lamination of component films, coextrusion of different polymers, or chemical modification of one or more layers of a preformed membrane, or a combination of these procedures. Such procedures are ordinarily performed on films having functional groups which are not in ion-exchange form, and so must be subsequently converted to ion-exchange form, with attendant problems such as inadequate adhesion of the layers after performing steps such as hydrolysis. Avoidance of such complex preparation is highly desirable. Furthermore, scrap produced in such complex preparative methods is often a total loss, inasmuch as the components thereof can be recovered separately only with great difficulty or not at all; scrap which cannot be recycled or recovered is a highly significant loss in this field in view of the high cost of the fluorinated components.

In East German Patent Specification No. 76,478 and British Patent Specification No. 1,273,164, which are in the names of the same inventors, there is disclosed a combination of two cation exchanger films arranged next to one another in a chloralkali cell. As pointed out in East German Patent Specification No. 93,990, a disadvantage to such arrangement is that the two films employed have very different swelling properties, as a result of which distortions arise across the entire surface thereof, spaces filled with electrolyte form between the two films, and undesired polarisation phenomena occur which adversely affect the economics of the electrolysis. Further, it would be desirable to attain even greater current efficiency than the 85% disclosed and attained in East German No. 76,478.

It is therefore a principal object of this invention to provide a multilayered membrane which is more simply made than by heretofore known methods, and by a method which does not require high investment in machinery.

It is a further object to provide multilayered membrane made such that production of scrap from which recovery of the component materials is difficult is avoided.

It is a still further object to provide a multilayered membrane wherein the non-adhered layers thereof do not tend to separate from one another during use in electrolysis of brine in a chloralkali cell, and which provides high current efficiency.

SUMMARY OF THE INVENTION

Briefly, according to the present invention, there is provided a membrane assembly having a layer of polymer which has carboxylic functionality, a second layer of ion exchange polymer, and between these layers, either a water soluble adhesive or a water-containing stratum joining the layers.

More specifically there is provided a membrane assembly which comprises two layers of perfluorinated polymer having —COOM and/or —SO$_3$M functional groups, where M is Na, K or H, and ion exchange capacity of at least 0.6 milliequivalents/gram, a first said layer being of polymer which has —COOM functional groups and having a thickness of 10 to 100 microns and a second said layer being of polymer which has —COOM and/or —SO$_3$M functional groups and having a thickness of 50 to 150 microns, and, between said two layers, a stratum in contact with adjacent surfaces of said two layers, said stratum either (a) containing water and being of ionic strength no greater than 5 molar, or (b) being water soluble and film forming.

There are also provided according to the invention an electrochemical cell having said membrane assembly as a component part thereof, and an electrolysis process in which said membrane assembly is used.

DETAILED DESCRIPTION OF THE INVENTION

The membrane assembly of the present invention is typically prepared from two or more layers of perfluorinated polymer which have —COOM and/or —SO$_3$M functional groups, where M is Na, K or H.

The first layer of polymer with which the present invention is concerned is typically a carboxylic polymer having a fluorinated hydrocarbon backbone chain to which are attached the functional groups or pendant side chains which in turn carry the functional groups. The pendant side chains can contain, for example

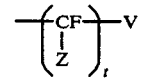

groups wherein Z is F or CF$_3$, t is 1 to 12, and V is —COOR or —CN, where R is lower alkyl. Ordinarily, the functional group in the side chains of the polymer will be present in terminal

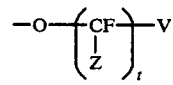

groups. Examples of fluorinated polymers of this kind are disclosed in British Pat. No. 1,145,445, U.S. Pat. No.

4,116,888 and U.S. Pat. No. 3,506,635. More specifically, the polymers can be prepared from monomers which are fluorinated or fluorine-substituted vinyl compounds. The polymers are usually made from at least two monomers. At least one monomer is a fluorinated vinyl compound such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of copolymers which will be used in electrolysis of brine, the precursor vinyl monomer desirably will not contain hydrogen. Additionally, at least one monomer is a fluorinated monomer which contains a group which can be hydrolyzed to a carboxylic acid group, e.g., a carboalkoxy or nitrile group, in a side chain as set forth above.

By "fluorinated polymer" is meant a polymer in which, after loss of the R group by hydrolysis to ion exchange form, the number of F atoms is at least 90% of the number of F atoms and H atoms.

The monomers, with the exception of the R group in the —COOR, will preferably not contain hydrogen, especially if the polymer will be used in the electrolysis of brine, and for greatest stability in harsh environments, most preferably will be free of both hydrogen and chlorine, i.e., will be perfluorinated; the R group need not be fluorinated as it is lost during hydrolysis when the functional groups are converted to ion exchange groups.

One exemplary suitable type of carboxyl-containing monomer is represented by the formula

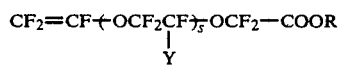

wherein
R is lower alkyl,
Y is F or CF$_3$, and
s is 0, 1 or 2.
Those monomers wherein s is 1 are preferred because their preparation and isolation in good yield is more easily accomplished than when s is 0 or 2. The compound

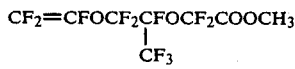

is an especially useful monomer. Such monomers can be prepared, for example, from compounds having the formula

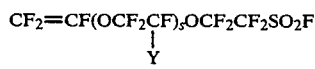

wherein s and Y are as defined above, by (1) saturating the terminal vinyl group with chlorine to protect it in subsequent steps by converting it to a CF$_2$Cl—CFCl— group; (2) oxidation with nitrogen dioxide to convert the —OCF$_2$CF$_2$SO$_2$F group to an —OCF$_2$COF group; (3) esterification with an alcohol such as methanol to form an —OCF$_2$COOCH$_3$ group; and (4) dechlorination with zinc dust to regenerate the terminal CF$_2$=CF— group. It is also possible to replace steps (2) and (3) of this sequence by the steps (a) reduction of the —OCF$_2$CF$_2$SO$_2$F group to a sulfinic acid, —OCF$_2$CF$_2$SO$_2$H, or alkali metal or alkaline earth metal salt thereof by treatment with a sulfite salt or hydrazine; (b) oxidation of the sulfinic acid or salt thereof with oxygen or chromic acid, whereby —OCF$_2$COOH groups or metal salts thereof are formed; and (c) esterification to —OCF$_2$COOCH$_3$ by known methods; this sequence, together with preparation of copolymers of such monomer, is more fully described in U.S. Pat. No. 4,267,364.

Another exemplary suitable type of carboxyl-containing monomer is represented by the formula

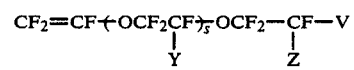

wherein
V is —COOR or —CN,
R is lower alkyl,
Y is F or CF$_3$,
Z is F or CF$_3$, and
s is 0, 1 or 2.
The most preferred monomers are those wherein V is —COOR wherein R is lower alkyl, generally C$_1$ to C$_5$, because of ease in polymerization and conversion to ionic form. Those monomers wherein s is 1 are also preferred because their preparation and isolation in good yield is more easily accomplished than when s is 0 or 2. Preparation of those monomers wherein V is —COOR where R is lower alkyl, and copolymers thereof, is described in U.S. Pat. No. 4,131,740. The compounds

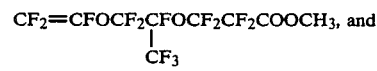

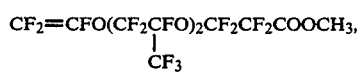

whose preparation is described therein, are especially useful monomers. Preparation of monomers wherein V is —CN is described in U.S. Pat. No. 3,852,326.

Yet another suitable type of carboxyl-containing monomer is that having a terminal —O(CF$_2$)$_v$COOCH$_3$ group where v is from 2 to 12, such as CF$_2$=CF—O(CF$_2$)$_3$COOCH$_3$ and CF$_2$=CFOCF$_2$CF(CF$_3$)O(CF$_2$)$_3$COOCH$_3$. Preparation of such monomers and copolymers thereof is described in British Pat. Specification No. 1,518,387 and U.S. Pat. No. 3,641,104.

Another class of carboxyl-containing polymers is represented by polymers having the repeating units

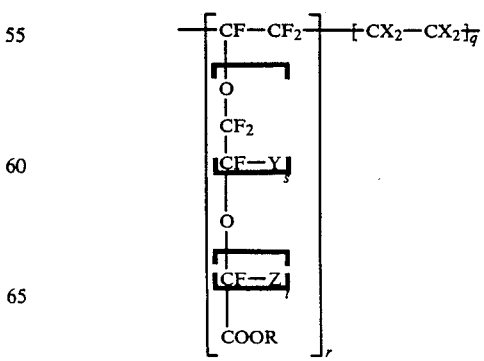

wherein
q is 3 to 15,
r is 1 to 10,
s is 0, 1 or 2,
t is 1 to 12,
the X's taken together are four fluorines or three fluorines and one chlorine,
Y is F or $CF_3$,
Z is F or $CF_3$, and
R is lower alkyl.

A preferred group of copolymers are those of tetrafluoroethylene and a compound having the formula

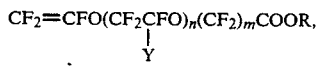

$$CF_2=CFO(CF_2CFO)_n(CF_2)_mCOOR,$$
$$\quad\quad\quad\quad\quad\quad |$$
$$\quad\quad\quad\quad\quad\quad Y$$

where
n is 0, 1 or 2,
m is 1, 2, 3 or 4,
Y is F or $CF_3$, and
R is $CH_3$, $C_2H_5$ or $C_3H_7$.

Such copolymers with which the present invention is concerned can be prepared by techniques known in the art, e.g., U.S. Pat. No. 3,528,954, U.S. Pat. No. 4,131,740, and South African Pat. No. 78/2225.

The sulfonyl polymer with which the present invention is concerned is typically a polymer having a fluorinated hydrocarbon backbone chain to which are attached the functional groups or pendant side chains which in turn carry the functional groups. The pendant side chains can contain, for example,

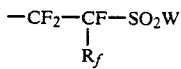

$$-CF_2-CF-SO_2W$$
$$\quad\quad\;\;|$$
$$\quad\quad\;\;R_f$$

groups wherein $R_f$ is F, Cl, or a $C_1$ to $C_{10}$ perfluoroalkyl radical, and W is F or Cl, preferably F. Ordinarily, the functional group in the side chains of the polymer will be present in terminal

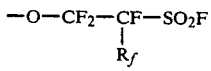

$$-O-CF_2-CF-SO_2F$$
$$\quad\quad\quad\quad\;\;|$$
$$\quad\quad\quad\quad\;\;R_f$$

groups. Examples of fluorinated polymers of this kind are disclosed in U.S. Pat. No. 3,282,875, U.S. Pat. No. 3,560,568 and U.S. Pat. No. 3,718,627. More specifically, the polymers can be prepared from monomers which are fluorinated or fluorine substituted vinyl compounds. The polymers are made from at least two monomers, with at least one of the monomers coming from each of the two groups described below.

At least one monomer is a fluorinated vinyl compound such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of copolymers which will be used in electrolysis of brine, the precursor vinyl monomer desirably will not contain hydrogen.

The second group is the sulfonyl-containing monomers containing the precursor group

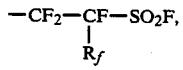

$$-CF_2-CF-SO_2F,$$
$$\quad\quad\;\;|$$
$$\quad\quad\;\;R_f$$

wherein $R_f$ is as defined above. Additional examples can be represented by the general formula $CF_2=CF-T-k-CF_2SO_2F$ wherein T is a bifunctional fluorinated radical comprising 1 to 8 carbon atoms, and k is 0 or 1. Substituent atoms in T include fluorine, chlorine, or hydrogen, although generally hydrogen will be excluded in use of the copolymer for ion exchange in a chloralkali cell. The most preferred polymers are free of both hydrogen and chlorine attached to carbon, i.e., they are perfluorinated, for greatest stability in harsh environments. The T radical of the formula above can be either branched or unbranched, i.e., straight-chain, and can have one or more ether linkages. It is preferred that the vinyl radical in this group of sulfonyl fluoride containing comonomers be joined to the T group through an ether linkage, i.e., that the comonomer be of the formula $CF_2=CF-O-T-CF_2-SO_2F$. Illustrative of such sulfonyl fluoride containing comonomers are

$$CF_2=CFOCF_2CF_2SO_2F,$$

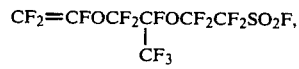

$$CF_2=CFOCF_2CFOCF_2CF_2SO_2F,$$
$$\quad\quad\quad\quad\quad\;\;|$$
$$\quad\quad\quad\quad\quad\;\;CF_3$$

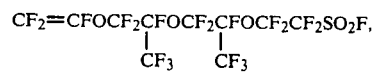

$$CF_2=CFOCF_2CFOCF_2CFOCF_2CF_2SO_2F,$$
$$\quad\quad\quad\quad\quad\;\;|\quad\quad\quad\;\;|$$
$$\quad\quad\quad\quad\quad\;\;CF_3\quad\quad CF_3$$

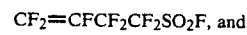

$$CF_2=CFCF_2CF_2SO_2F, \text{ and}$$

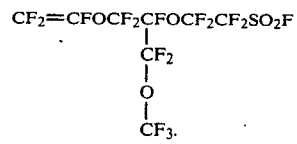

$$CF_2=CFOCF_2CFOCF_2CF_2SO_2F$$
$$\quad\quad\quad\quad\quad\;\;|$$
$$\quad\quad\quad\quad\quad\;\;CF_2$$
$$\quad\quad\quad\quad\quad\;\;|$$
$$\quad\quad\quad\quad\quad\;\;O$$
$$\quad\quad\quad\quad\quad\;\;|$$
$$\quad\quad\quad\quad\quad\;\;CF_3.$$

The most preferred sulfonyl fluoride containing comonomer is perfluoro(3,6-dioxa-4-methyl-7-octenesulfonyl fluoride),

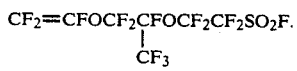

$$CF_2=CFOCF_2CFOCF_2CF_2SO_2F.$$
$$\quad\quad\quad\quad\quad\;\;|$$
$$\quad\quad\quad\quad\quad\;\;CF_3$$

The sulfonyl-containing monomers are disclosed in such references as U.S. Pat. No. 3,282,875, U.S. Pat. No. 3,041,317, U.S. Pat. No. 3,718,627 and U.S. Pat. No. 3,560,568.

A preferred class of such polymers is represented by polymers having the repeating units

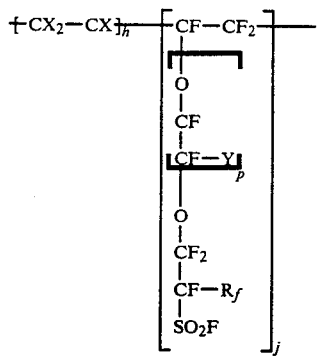

wherein h is 3 to 15, j is 1 to 10, p is 0, 1 or 2, the X's taken together are four fluorines or three fluorines and one chlorine, Y is F or CF$_3$, and R$_f$ is F, Cl or a C$_1$ to C$_{10}$ perfluoroalkyl radical.

A most preferred copolymer is a copolymer of tetrafluoroethylene and perfluoro(3,6-dioxa-4-methyl-7-octenesulfonyl fluoride) which comprises 20 to 65 percent, preferably, 25 to 50 percent by weight of the latter.

Such copolymers used in the present invention can be prepared by general polymerization techniques developed for homo- and copolymerizations of fluorinated ethylenes, particularly those employed for tetrafluoroethylene which are described in the literature. Nonaqueous techniques for preparing the copolymers include that of U.S. Pat. No. 3,041,317, that is, by the polymerization of a mixture of the major monomer therein, such as tetrafluoroethylene, and a fluorinated ethylene containing a sulfonyl fluoride group in the presence of a free radical initiator, preferably a perfluorocarbon peroxide or azo compound, at a temperature in the range 0–200° C. and at pressures in the range of $10^5$ to $2 \times 10^7$ pascals (1–200 Atm.) or higher. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene and the like, and inert, liquid chlorofluorocarbons such as 1,1,2-trichloro-1,2-2-trifluoroethane, and the like.

Aqueous techniques for preparing the copolymer include contacting the monomers with an aqueous medium containing a free-radical initiator to obtain a slurry of polymer particles in non-water-wet or granular form, as disclosed in U.S. Pat. No. 2,393,967, or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752 and U.S. Pat. No. 2,593,583.

A copolymer which contains different types of functional groups can also be used as one of the component films in making the membrane assembly of the invention. For example, a terpolymer prepared from a monomer chosen from the group of nonfunctional monomers described above, a monomer from the group of carboxylic monomers described above, and additionally a monomer from the group of sulfonyl monomers described above, can be prepared and used, after hydrolysis, as one of the film components in making the membrane assembly.

It is further possible to use as one of the component films of the membrane assembly a film which is a blend of two or more polymers. For example, a blend of a polymer having sulfonyl groups in melt-fabricable form with a polymer having carboxyl groups in melt-fabricable form can be prepared and used, after hydrolysis, as one of the component films of the membrane assembly of this invention.

It is additionally possible to use a laminar film as one of the component films in making the membrane assembly. For example, a film having a layer of a copolymer having sulfonyl groups and a layer of a copolymer having carboxyl groups can also be used, after hydrolysis, as one of the component films in making the membrane assembly of the invention. Although a membrane assembly which contains such a laminar film does not lend itself to easy recovery of each polymer present in the assembly, it does allow for recovery of the individual component films (of which one or more may, in fact, be of only one polymer), and is more simply made than a membrane wherein all layers are permanently adherently bound together.

When used to separate the anode and cathode compartments of an electrolysis cell, such as a chloralkali cell, the sulfonate polymers dealt with herein, after conversion to ionizable form, should have a total ion exchange capacity of 0.5 to 2 meq/g (milliequivalents/gram), preferably at least 0.6 meq/g, and more preferably from 0.8 to 1.4 meq/g. Below an ion exchange capacity of 0.5 meq/g, the electrical resistivity becomes too high, and above 2 meq/g the mechanical properties are poor because of excessive swelling of the polymer. The relative amounts of the comonomers which make up the polymer should be adjusted or chosen such that the polymer has an equivalent weight no greater than about 2000, preferably no greater than about 1400, for use as an ion exchange barrier in an electrolytic cell. The equivalent weight above which the resistance of a film or membrane becomes too high for practical use in an electrolytic cell varies somewhat with the thickness of the film or membrane. For thinner films and membranes, equivalent weights up to about 2000 can be tolerated. Ordinarily, the equivalent weight will be at least 600, and preferably will be at least 900. Film of polymer having sulfonyl groups in ion exchange form preferably will have an equivalent weight in the range of 900 to 1500. For most purposes, however, and for films of ordinary thickness, a value no greater than about 1400 is preferred.

For the carboxylate polymers dealt with herein, when used to separate the compartments of a chloralkali cell, the requirements in respect to the ion exchange capacity thereof differ from those of the sulfonate polymers. The carboxylate polymer must have an ion exchange capacity of at least 0.6 meq/g, preferably at least 0.7 meq/g, and most preferably at least 0.8 meq/g, so as to have acceptably low resistance. Such values are especially applicable in the case of films having a thickness in the lower end of the specified thickness range of 10 to 100 microns; for films in the middle and upper end of this range, the ion exchange capacity should be at least 0.7 meq/g and preferably at least 0.8 meq/g. The ion exchange capacity should be no greater than 2 meq/g, preferably no greater than 1.5 meq/g, and more preferably no greater than 1.3 meq/g. In terms of equivalent weight, the carboxylate polymer most preferably has an equivalent weight in the range of 770 to 1250.

The membrane assembly of the invention is prepared from component polymer films which have a thickness ranging from as low as about 10 microns (0.4 mil) up to about 150 microns (6 mils). As the membrane assembly will generally be prepared from two such polymer films, the overall thickness of polymer in the resulting membrane will generally lie in the range of about 50 to 200 microns (2 to 8 mils), preferably 75 to 175 microns (3 to 7 mils).

The first layer of the membrane assembly, which has —COOM functional groups, has a thickness of 10 to 100 microns, preferably 30 to 60 microns. The second layer of the membrane assembly, which has —COOM and/or —SO$_3$M functional groups, has a thickness of 50 to 150 microns, preferably 75 to 125 microns.

The component films used in making the membrane assembly of the invention may contain reinforcement therein to provide improved strength thereto. Such reinforcement can be in the form of individual fibers, non-woven paper or fabric, or woven or knit fabric; as used herein, the term "fibers" includes not only chopped fibers cut from filaments, but also fibrids and fibrils. Such reinforcement is ordinarily made of a perhalocarbon polymer. By "perhalocarbon polymer" is meant a polymer which has a carbon chain which may or may not contain ether oxygen linkages therein and which is totally substituted by fluorine or by fluorine and chlorine atoms. Preferably the perhalocarbon polymer is a perfluorocarbon polymer, as it has greater chemical inertness. Typical such polymers include homopolymers made from tetrafluoroethylene and copolymers of tetrafluoroethylene with hexafluoropropylene and/or perfluoro(alkyl vinyl ethers) with alkyl being 1 to 10 carbon atoms such as perfluoro(propyl vinyl ether). An example of a most preferred reinforcement material is polytetrafluoroethylene. Reinforcement threads made from chlorotrifluoroethylene polymers are also useful. A typical non-woven structure is a microporous sheet of polytetrafluoroethylene having a microstructure characterized by nodes interconnected by fibrils, made by high-rate stretching at an elevated temperature of an unsintered, dried paste extrudate of polytetrafluoroethylene, as described in U.S. Pat. No. 3,962,153, and commercially available from W. L. Gore & Associates, Inc., under the trademark "Gore-Tex" expanded polytetrafluoroethylene. In the case of film reinforced by woven or knit fabric, the reinforced film should have a relatively flat (planar) surface and will be arranged with the flat surface facing toward the other film layer of the assembly, so as to make for easier elimination of gas or air bubbles from the stratum joining the layers; such fabric-reinforced film should be made under such conditions of temperature and pressure to provide a relatively flat surface and/or made with a relatively flat reinforcing fabric. Either or both of the component film layers of the membrane assembly may contain such reinforcement. Although a membrane assembly made from reinforced films will be stronger than one made of unreinforced films, if the surfaces of the films which contact the stratum between them are not relatively flat, there will be a tendency to entrapment of gas bubbles. Accordingly, use of films which contain either a flat reinforcement or no reinforcement at all is preferred over use of film containing a woven or knit reinforcement fabric. Film thicknesses set forth in this specification are in reference to the ion-exchange polymer film before reinforcement material is embedded therein, and therefore is a nominal ion-exchange thickness, not an overall layer thickness.

For use in ion exchange applications and in cells, for example a chloralkali cell for electrolysis of brine, the membrane assembly should have all of the functional groups converted to ionizable functional groups. Ordinarily and preferably these will be sulfonic acid and carboxylic acid groups, or alkali metal salts thereof, i.e., —COOM and/or —SO$_3$M functional groups, where M is Na, K or H; most preferably M is Na or K, as a chloralkali cell will start more easily and quickly in such case than when M is H. Such conversion is ordinarily and conveniently accomplished by hydrolysis with acid or base, such that the various functional groups described above in relation to the melt-fabricable polymers are converted respectively to the free acids or the alkali metal salts thereof. Such hydrolysis can be carried out with an aqueous solution of a mineral acid or an alkali metal hydroxide. Base hydrolysis is preferred as it is faster and more complete. Use of hot solutions, such as near the boiling point of the solution, is preferred for rapid hydrolysis. The time required for hydrolysis increases with the thickness of the structure. It is also of advantage to include a water-miscible organic compound such as dimethylsulfoxide in the hydrolysis bath. Although hydrolysis of carboxylic ester groups of these fluorinated polymers occurs so readily that it easily takes place under conditions prevailing in an electrolysis cell, so that a membrane assembly wherein any carboxyl groups present are in the form of carboxylic ester might therefore be placed directly into an electrolytic cell, and the ester groups will hydrolyze, generally within a few hours, such does not produce a satisfactory result, because the carboxylic ester film cannot be wet out until after hydrolysis of the ester groups, whereupon it swells, thus producing undesirable folds, puckers and/or gaps.

The copolymers used in the layers described herein should be of high enough molecular weight to produce films which are at least moderately strong in both the melt-fabricable precursor form and in the hydrolyzed ion exchange form.

The membrane assembly of the invention is made by joining together the component films with a stratum that either (a) contains water and is of ionic strength no greater than 5 molar, preferably no greater than 1 molar, or (b) is water soluble and film forming. The joining is carried out such that no bubbles of air or other gas are trapped between the films; as they interfere with use of the total film area during operation of a cell.

Concerning those strata which contain water, there are several variants. First, the stratum can be water.

Second, the stratum can be a solution of a substance such as a salt, base or acid in water. Sodium chloride, sodium hydroxide, potassium chloride and potassium hydroxide are examples of such substances. Such solution should have an ionic strength no greater than 5 molar, because at higher ionic strengths, once the membrane assembly is mounted in a cell, permeation of water by osmotic pressure forces the layers of the membrane assembly to separate. Preferably the ionic strength of the stratum is no greater than 1 molar.

Third, the stratum can be a solution of a viscosity builder in water. This type of stratum has an advantage over the first and second types of strata in its higher viscosity. The first and second types of strata tend to leak from between the layers of film because of their low viscosity, thus undesirably permitting air bubbles and gaps to form between the films. A stratum containing an aqueous solution of a viscosity builder is far less prone to formation of air bubbles and gaps, and greatly improves the ease of handling during joining of the component films and during assembly of the cell. Examples of suitable viscosity builders include sodium silicate, polyvinyl alcohol, polyacrylic acid and the sodium and potassium salts thereof, polyvinylpyrrolidone, various sugars such as sucrose, starch, and various water soluble gums or gelling agents such as gum agar which form a gel.

Fourth, the stratum can be a combination of the second and third strata, i.e., it can be an aqueous solution containing both a viscosity builder and a salt, base or acid, and having an ionic strength as described above.

Turning now to those strata which are water soluble and film forming, again there are variants. "Film forming", as employed herein, refers to either a solid or a liquid film. "Water soluble", as employed herein, refers to a substance which is soluble in water or an aqueous caustic solution.

First, this stratum can be a solid film former. Examples of such suitable water soluble film formers include polyvinyl alcohol, polyacrylic acid and the sodium and potassium salts thereof, polyvinylpyrrolidone, and starch. Such film formers will ordinarily be applied by application of an aqueous solution of the film former between the component film layers of the membrane assembly, such that no air or gas bubbles are entrapped, followed by drying to remove the water solvent at room temperature or elevated temperature. Alternatively, in those cases where the film former is soluble in an organic solvent, it can be applied as a solution in an organic solvent followed by drying, and in those cases where the film former melts without decomposition, it can be applied in the molten state.

Second, this stratum can be a liquid film former. Examples of such suitable water soluble film formers include liquid mono- and polyhydric alcohols such as glycerin, ethylene glycol, propylene glycol, n- and isopropyl alcohol, and n-butanol. Such liquid film formers should be capable of permeating at least one of the water-swollen film layers of the membrane assembly; this can easily be determined by making a simple permeability test using a water-swollen film.

In making the membrane assembly when a water-containing stratum is used, both films should be pre-swollen prior to joining them. A suitable way to make such membrane assembly is to first soak the component layers of perfluorinated polymer in water, optionally remove excess water from their surfaces, then place between them the composition which is to become the component stratum and spread said composition, and squeeze the assembly as necessary so as to cause any entrapped gas bubbles to be removed from between said layers at the edges thereof. If the stratum is a water-soluble film forming substance, it can be applied as an aqueous solution, and the assembly can then be dried; if such water-soluble substance is additionally melt-fabricable, it can be applied to films which have not been preswollen, by melt application to make the membrane assembly.

When the stratum of the membrane assembly is plain water or an aqueous solution having a viscosity near that of water, some degree of care needs to be used in making the membrane assembly, because if the films have any tendency to pull apart (e.g., due to curl of the films) the cell may not start up even if there are no gas bubbles, as the stratum may simply have too great a thickness. The film layers should be close to one another, and this is easier to attain if a viscosity builder is used.

In the membrane assembly, the stratum can vary widely in thickness; it will ordinarily be at least one micron (0.04 mil) in thickness, but will not exceed 250 microns (10 mils). Preferably, it will be at least 5 microns (0.2 mil) thick. Also it will preferably be less than 100 microns (4 mils) thick.

In regard to storage and shipment of the membrane assembly of the invention, those with a stratum of an aqueous solution containing a viscosity builder are preferred over those with a stratum of aqueous solution without a viscosity builder because of less leakage, and those with a stratum of a solid, water soluble, film former are most preferred. Inasmuch as some of the stratum, or at least some of the liquid component thereof, may be absorbed into the component layers of the membrane assembly over an extended time period, e.g. during storage or shipping, the composition of the stratum may change over such period.

A preferred membrane assembly of the invention is that wherein substantially all of the functional groups of the first layer of fluorinated polymer are —COOM functional groups, and substantially all of the functional groups of the second layer of fluorinated polymer are —SO$_3$M functional groups. By "substantially all" is meant 90% or more. Said first layer will ordinarily have a thickness in the range of about 10 to 100 microns, and said second layer a thickness in the range of about 50 to 150 microns. Such a membrane assembly is a preferred membrane assembly for a chloralkali cell. It should be understood that while membrane assemblies of the invention usually have two layers of fluorinated polymer, they can also have three or more layers of polymer, including a layer of polymer having —COOM groups and a layer of polymer having —SO$_3$M groups, and in such case, there will be a water-containing or water-soluble stratum between each adjacent pair of fluorinated polymer layers.

A principal use of the membrane assembly of the invention is in electrochemical cells. Such a cell comprises an anode, a compartment for the anode, a cathode, a compartment for the cathode, and a membrane assembly which is situated to separate the two said compartments. One example is a chloralkali cell, for which the membrane assembly should have the functional groups in salt form.

The membrane assembly of the invention, regardless of whether the stratum between the polymer film layers is water-containing or water-soluble, is mounted between the anode and cathode compartments of an electrochemical cell, which is then started up and operated in standard manner.

To further illustrate the innovative aspects of the present invention, the following examples are provided.

EXAMPLES

Example 1

A 51-micron (2-mil) film of copolymer of tetrafluoroethylene (referred to hereinafter as TFE) and methyl perfluoro(4,7-dioxa-5-methyl-8-nonenoate) (referred to hereinafter as EVE) having an equivalent weight of 1080 and a 127-micron (5-mil) film of copolymer of TFE and perfluoro(3,6-dioxa-4-methyl-7-octenesulfonyl fluoride) (referred to hereinafter as PSEPVE) having a equivalent weight of 1100 were hydrolyzed in an aqueous bath containing 30% dimethyl sulfoxide and 11% KOH for 20 minutes at 90° C. Care was taken during hydrolysis to maintain the films in a flat condition and free from wrinkles. The films were then rinsed in water until free of excess alkali. The two films were then joined by placing a small amount of water between them and pressing lightly to displace any air bubbles. The membrane assembly of wet combined films was mounted in a small chlor-alkali cell having an active area of 45 cm$^2$ between a dimensionally stable anode and a nickel-plated steel cathode, with the membrane assembly positioned so that the film of TFE/EVE copolymer was on the cathode side. The cell was started up and operated at 80° C. with a current density of 3.1 kA/m². The depleted anolyte concentration was controlled at 200 gpl initially but was varied from 136 to 250 gpl during the course of the experiment. Water was added to the catholyte to maintain the concentration of caustic produced at 32±1% by weight. The cell operated at 95.3% caustic current efficiency and 3.75 volts after 4 days. The performance of the membrane assembly remained stable with time, giving 94.5% current efficiency at the conclusion of the test after 164 days. The joined films of the membrane assembly were still in intimate contact upon removal from the cell, but could be easily separated from one another.

Example 2

Example 1 was repeated except that the film of TFE/PSEPVE copolymer was only 51 microns (2 mils) thick. After operation for 2 days in a cell similar to that of Example 1 the caustic current efficiency was 96.1% and the voltage was 3.62 volts. The nickel cathode was then replaced by a mild steel cathode having a Raney nickel coating. The cell temperature was increased to 87° C. Under these conditions the cell voltage was 3.1 volts at 3.1 kA/m² while maintaining current efficiency at 96%. The component layers of the membrane assembly remained close together throughout the test.

Example 3

Example 1 was repeated except that a concentrated solution of sodium silicate was used to adhere the two layers together. The high viscosity solution simplified removal of air bubbles and handling of the membrane assembly during installation in the cell. While the cell was heating up, full current (14 amperes) was turned on at 70° C. The performance after 1 day was 96.4% current efficiency and 3.76 volts. The component layers of the membrane assembly remained close together.

Example 4

A 51-micron (2-mil) film of TFE/EVE copolymer having an equivalent weight of 1080 and a 51-micron (2-mil) film of TFE/PSEPVE copolymer having an equivalent weight of 1100 were hydrolyzed separately and then rinsed with water and the surplus moisture removed. The films were then joined into a membrane assembly with a 10% solution of polyvinyl alcohol (Mowiol 40-88 supplied by Hoechst) in water. Use of this viscous solution made it easier to press out air bubbles from between the films and to handle the resulting membrane assembly. The membrane assembly was dried and the polyvinyl alcohol behaved as an adhesive joining the films together. The dried membrane assembly was mounted in a cell of the type in Example 1. After 4 days the cell was performing at 97% current efficiency and 3.71 volts at 3.1 kA/m². There was some foaming in the cell, which ended after about the first two days. The component layers of the membrane assembly remained close together throughout the test. It would also be possible to mount in the cell the above membrane assembly as first made, i.e., the undried membrane assembly, with substantially the same results.

INDUSTRIAL APPLICABILITY

The membrane assembly of the present invention is useful for separating the anode and cathode compartments of electrochemical cells, especially a chloralkali electrolysis cell. It is more simply and easily made than are multilayered membranes of the prior art, with less investment in equipment than is required to make known multilayered membranes. It allows for easy recovery of the component materials from scrap, and for easy replacement of a damaged layer in the membrane assembly with re-use of undamaged layers.

We claim:

1. A membrane assembly which comprises two layers of perfluorinated polymer having —COOM and/or —SO$_3$M functional groups, where M is Na, K or H, and ion exchange capacity of at least 0.6 milliequivalents/gram, a first said layer being of polymer which has —COOM functional groups and having a thickness of 10 to 100 microns and a second said layer being of polymer which has —COOM and/or —SO$_3$M functional groups and having a thickness of 50 to 150 microns, and, between said two layers, a stratum in contact with adjacent surfaces of said two layers, said stratum having a thickness from 1 to 250 microns, said stratum either (a) being water or an aqueous solution of ionic strength no greater than 5 molar, or (b) being water soluble and film forming.

2. The membrane assembly of claim 1 wherein substantially all of the functional groups of the polymer of said first layer are —COOM groups, the polymer of said first layer has an ion exchange capacity of at least 0.7 milliequivalents/gram, substantially all the functional groups of the polymer of said second layer are —SO$_3$M groups, and M is Na or K.

3. The membrane assembly of claim 2 wherein said stratum is water or an aqueous solution.

4. The membrane assembly of claim 3 wherein said stratum is water.

5. The membrane assembly of claim 3 wherein said stratum is an aqueous solution of the chloride or hydroxide of sodium or potassium having an ionic strength no greater than 1 molar.

6. The membrane assembly of claim 3 wherein said stratum is an aqueous solution which contains a viscosity builder.

7. The membrane assembly of claim 6 wherein said viscosity builder is sodium silicate, polyvinyl alcohol, polyacrylic acid or the sodium or potassium salt thereof, or polyvinylpyrrolidone.

8. The membrane assembly of claim 7 wherein said aqueous solution also contains the chloride or hydroxide of sodium or potassium and has an ionic strength no greater than 1 molar.

9. The membrane assembly of claim 2 wherein said stratum is a water soluble stratum.

10. The membrane assembly of claim 9 wherein said stratum is polyvinyl alcohol, polyacrylic acid or the sodium or potassium salt thereof, polyvinylpyrrolidone, or starch.

11. The membrane assembly of claim 9 wherein said stratum is a liquid mono- or polyhydric alcohol.

12. The membrane assembly of claim 11 wherein said alcohol is glycerin, ethylene glycol or propylene glycol.

13. The membrane assembly of claim 2, 4, 6, 9 or 10 wherein said first layer has a thickness of 30 to 60 microns and said second layer has a thickness of 75 to 125 microns, and the equivalent weights of the polymers of said layers are no greater than about 1400.

* * * * *